United States Patent
Huang

(10) Patent No.: US 6,567,139 B2
(45) Date of Patent: May 20, 2003

(54) COLOR FILTER AND MANUFACTURING METHOD THEREOF

(75) Inventor: Sheng-Kai Huang, Hsinchu (TW)

(73) Assignee: Chi Mei Optoelectronics Corp. (TW)

( * ) Notice: Subject to any disclaimer, the term of this patent is extended or adjusted under 35 U.S.C. 154(b) by 0 days.

(21) Appl. No.: 09/915,696

(22) Filed: Jul. 26, 2001

(65) Prior Publication Data

US 2002/0130992 A1 Sep. 19, 2002

(30) Foreign Application Priority Data

Mar. 16, 2001 (TW) .......................... 90106286 A

(51) Int. Cl.⁷ ............................................. G02F 1/1335
(52) U.S. Cl. .................. 349/110; 438/30; 349/156; 349/84
(58) Field of Search ................... 349/106, 155, 349/156, 187; 430/7; 438/30, 29, 84

(56) References Cited

U.S. PATENT DOCUMENTS

| | | | | |
|---|---|---|---|---|
| 4,818,075 A | * | 4/1989 | Takao et al. ................ 349/106 |
| 5,850,271 A | * | 12/1998 | Kim et al. ................... 349/111 |
| 6,208,394 B1 | * | 3/2001 | Tanaka et al. .............. 349/106 |
| 6,245,469 B1 | * | 6/2001 | Shiba et al. .................... 430/7 |
| 6,392,728 B2 | * | 5/2002 | Tanaka et al. .............. 349/106 |
| 6,400,440 B1 | * | 6/2002 | Colgan et al. .............. 349/160 |
| 6,429,918 B1 | * | 8/2002 | Choi et al. .................. 349/111 |

\* cited by examiner

*Primary Examiner*—Kenneth Parker
(74) *Attorney, Agent, or Firm*—Powell Goldstein Murphy & Frazer LLP

(57) ABSTRACT

The present invention relates to a color filter structure and to a method for manufacturing the color filter, and the method is to use the combination of photolithography and backside exposure in a self-alignment manner to form flat red color filter elements, green color filter elements and blue color filter elements, and then to form a black matrix on the top of a transparent conductive layer, i.e., the transparent conductive layer is located between the black matrix and the color filter elements, so as to increase the open ratio and reduce the errors in applying a process window.

19 Claims, 4 Drawing Sheets

COLOR FILTER AND MANUFACTURING METHOD THEREOF

FIELD OF THE INVENTION

The present invention relates to a color filter structure and its manufacturing method. More particularly, the present invention relates to a method for manufacturing the color filter by using the backside exposure method in a self-alignment manner.

BACKGROUND OF THE INVENTION

Liquid crystal display (LCD) has the advantages of thin thickness, light weight, low radiation and low power consumption, and has become a newly developed computer peripheral industry, and the most important element thereof is a color filter (CF).

Color filter is generally used in the application of the LCD for the display in colors. As shown in FIG. 1, a typical structure of a color filter comprises, from the bottom to the top, a substrate 10, a black matrix 12, color filter elements 14, 16 and 18, and a transparent conductive layer 20, wherein the substrate 10 is made of transparent glass and the color filter elements 14, 16 and 18 are generally composed of the three primary colors of red (R), green (G), and blue (B).

A conventional process for manufacturing a color filter comprises the steps of: providing a substrate 10 made of a material such as glass; depositing the light-blocking material, for example, chromium (Cr), on the substrate 10 by a metal sputtering method; exposing and developing the light-blocking material to form a black matrix (BM) layer 12 in a required pattern by using a photolithographic method; depositing the required color filter elements of red 14, green 16, or blue 18 on the BM 12 by, for example, spinning and photolithography; and forming a transparent conductive layer 20, for example, an indium tin oxide film (ITO film), to complete the fabrication of a color filter structure.

The conventional process needs to repeat the photolithographic process a plurality of times to complete the manufacture of a color filter. Besides, the conventional process is more complicated due to the alignment errors between the structure of the lower part of BM 12 and each individual color filter element where there are overlapping bulges or gaps between the color filter elements. According to the structure as shown in FIG. 1, the green color filter element 16 is shifted to the right and the blue color filter element 18 to the left, thus resulting in a bulged region and a wider division because of the overlap coating between two color filter elements. The flatness of the LCD is thereby affected, which causes the poor arrangement of liquid crystal in these regions.

Furthermore, for a conventional process, in order to form the color filter elements in better alignments, the width of each BM element needs to be increased to cover the area between two adjacent color filter elements and to thereby prevent light leakage. However, the open ratio is limited due to the increase of the width of BM elements, and the brightness of the LCD is thus decreased.

SUMMARY OF THE INVENTION

According to the above description of the background of art, conventional color filters have the disadvantages of misalignment in the manufacturing process and uneven structure, which directly affect the arrangement of liquid crystal and the brightness of the LCD. The present invention uses the backside exposure to fabricate a color filter, which can reduce the number of times for using the photomask and also improve the flatness of the color filter. Therefore, one object of the present invention is to form the self-aligned color filter elements with good flatness by combining the methods of etching and backside exposure.

Furthermore, by narrowing the shading area of black matrix between two adjacent color filter elements, the area of color filter elements is increased to enhance the transmittance of backlight and thereby the quality of the LCD is improved. Hence, another object of the present invention is to change the position of the black matrix to be on a transparent conductive layer. In other words, a transparent conductive layer is inserted between the layer of black matrix and the layer of color filer elements. By means of narrowing the width of BM element, increasing the open ratio, and reducing the alignment errors in applying a process window for forming BMs, the brightness of the LCD is enhanced.

According to the aforementioned objects, the present invention provides a method for forming color filter elements in a self-alignment manner without the disadvantages of a conventional process and the defects of a conventional structure. Further, the present invention provides a method of forming the black matrix upon a transparent conductive layer with a view to decreasing the width of BM elements, increasing the open ratio and reducing the errors in applying a process window. Consequently, the brightness of the LCD is enhanced.

To achieve the aforementioned objects, the present invention provides a method for manufacturing a color filter comprising: providing a substrate; forming a first resin layer on the substrate; defining the first resin layer to expose first portions of the substrate; forming a second resin layer on the first portions of the substrate; performing a first back-exposure process to transform the second resin layer into a second layer of color filter elements; defining the first resin layer to expose second portions of the substrate, wherein the remaining first resin layer on the substrate becomes a first layer of color filter elements; forming a third resin layer on the second portions of the substrate; and performing a second back-exposure process to transform the third resin layer into a third layer of color filter elements.

To achieve the aforementioned objects, the present invention provides a color filter structure, which comprises, from the bottom to the top: a substrate, a plurality of self-aligned color filter elements, a transparent conductive layer, and a layer of black matrix, wherein the substrate is made of transparent glass and the color filter elements are composed of the three primary colors of red (R), green (G), and blue (B). The color filter structure of the present invention is featured in that the color filter elements thereof have good flatness, and the BM layer is on the top of the transparent conductive layer, i.e., the transparent conductive layer is located between the BM layer and the layer of color filter elements.

According to the color filter structure and its manufacturing method of the present invention, there are several advantages described as follows: forming the color filter elements in a self-alignment manner by using the backside exposure, and thereby preventing the color filter elements from overlapping; repositioning each BM element to be on each color filter element for avoiding the bulging problem of color resin and thereby obtaining the color filter elements and the transparent conductive layer with good flatness; and further, reducing the width of BM elements by leaving the alignment concern aside, and thereby increasing the open ratio of color filter elements and avoiding the alignment problem in applying a process window.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In the manufacturing process, the conventional color filter elements 14, 16, and 18 are not easily aligned, so that the transparent conductive layer 20 is not flat on the surface of color filter elements because of the step height difference between the RGB and the BM. For compensating for errors of alignment, the width of BM 12 element is usually widened, however, the brightness is insufficient due to the decrease of aperture ratio. The advantage of the present invention is that, by using backside exposure, the color filter elements formed not only have the feature of self-alignment, but also have a flat surface without bulginess or concaveness. Further, forming a black matrix layer on a transparent conductive layer not only prevents the color resin from bulging caused by the non-uniform surface thickness, but also increases the open ratio and decreases the errors of applying a process window by reducing the width of black matrix elements.

Figure 1:
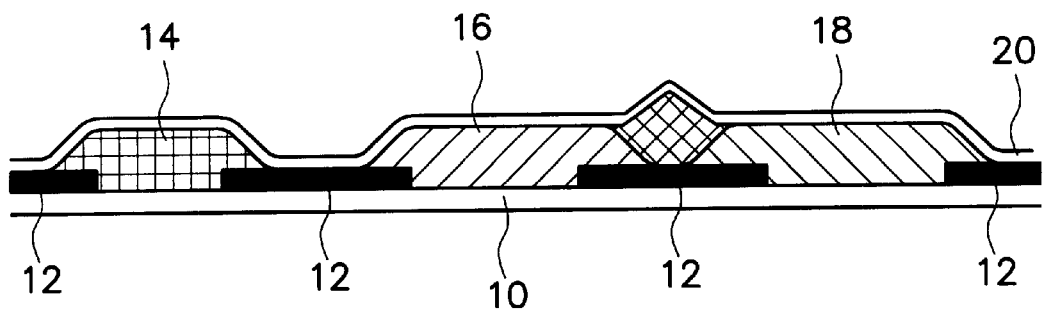
FIG. 1 is a schematic view of a conventional color filter structure.
Figure 2:
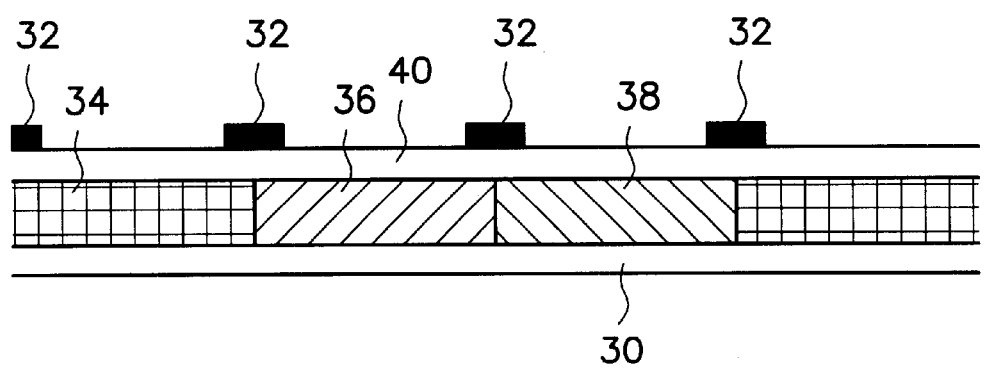
FIG. 2 is a schematic view of a color filter structure of the present invention.

FIG. 2 shows a color filter structure of the present invention, and the structure comprises, from the bottom to the top, a substrate 30, the self-aligned color filter elements 34, 36 and 38, a transparent conductive layer 40, and a black matrix 32, wherein the substrate 30 is made of transparent glass and the color filter elements 34, 36 and 38 are composed of the three primary colors of red (R), green (G), and blue (B). As for the characteristics of the present invention, besides the self-aligned color filter elements 34, 36 and 38, the present invention further forms a BM 32 on the transparent conductive layer 40, i.e., the transparent conductive layer 40 is located between the layer of BM 32 and the layer of color filter elements 34, 36 and 38.

Figure 3:
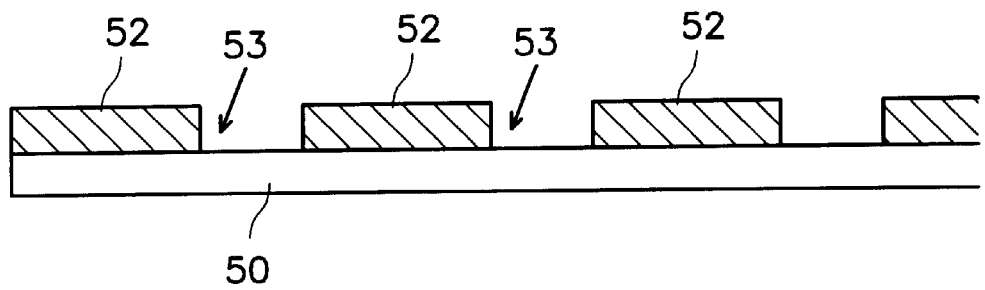
FIGS. 3A–3G are schematic views showing a manufacturing process according to one example of the present invention.
Figure 3:
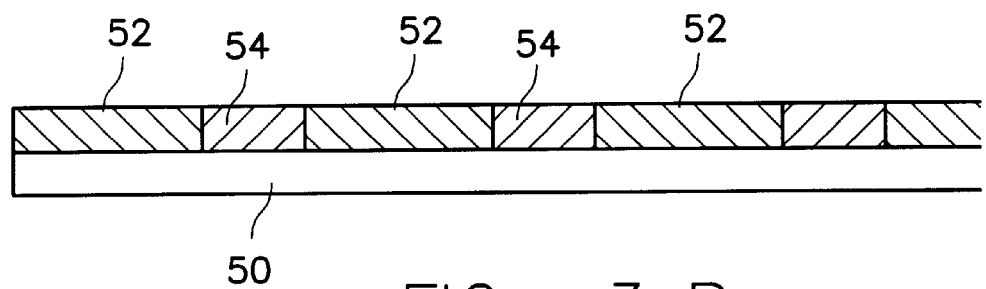
Figure 3:
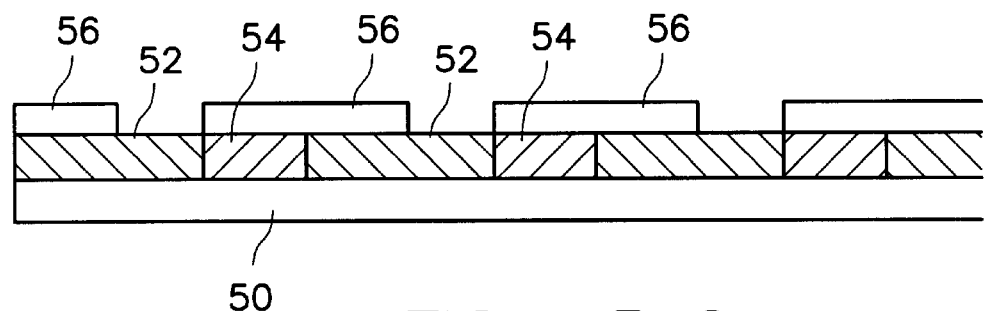
Figure 3:
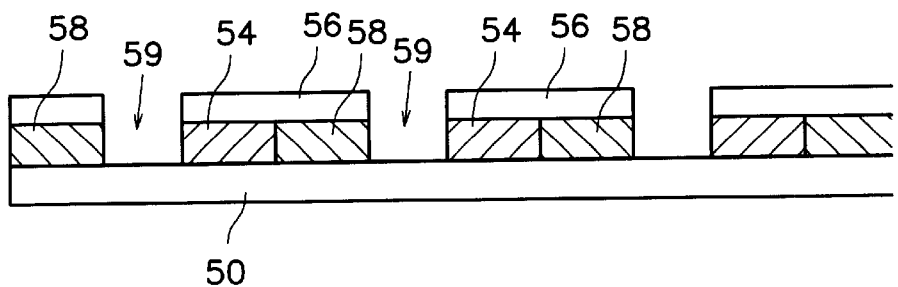
Figure 3:
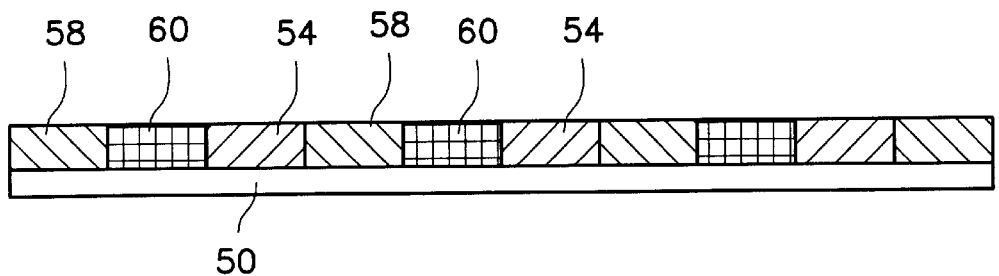
Figure 3:
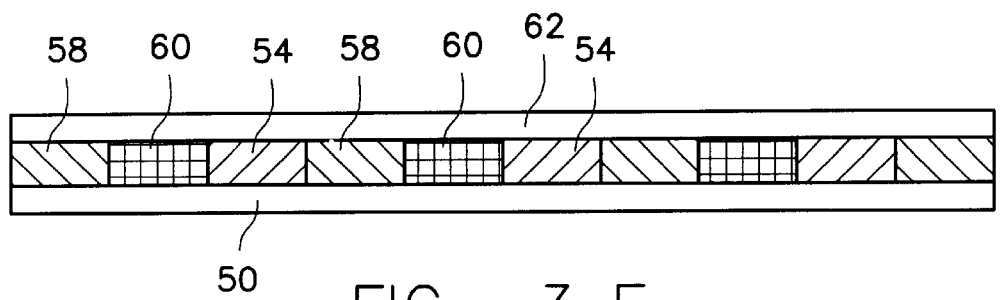
Figure 3:
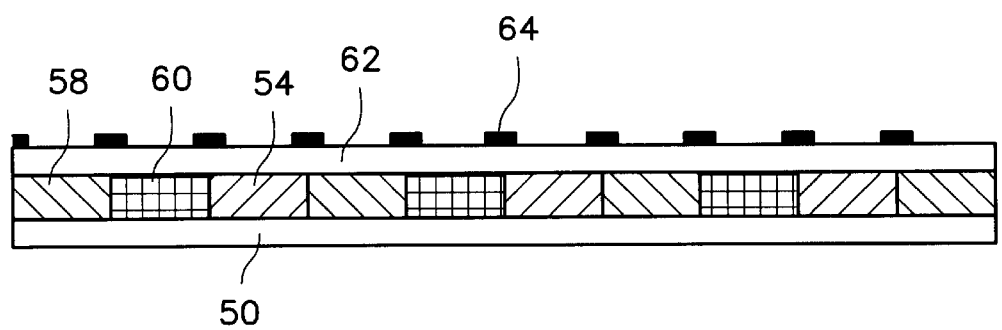

FIGS. 3A–3G are cross-sectional views of a color filter structure showing a manufacturing process of the present invention. Such as shown in FIGS. 3A–3G, a substrate 50 made of flat transparent glass is provided. Then, a blue resin layer is coated on the substrate 50 by, for example, spinning, and a photolithographic method is utilized to remove the blue resin on first portions 53 of the substrate 50 with the blue resin on the other portions 52 retained, as shown in FIG. 3A. In other words, the blue resin on the defined portions 52 includes a common area of blue color filter elements 58 and red color filter elements 60, wherein these two filter elements are to be formed later.

Thereafter, a green resin layer is coated on the substrate 50 by, for example, spinning, and a backside exposure is utilized directly from the back of substrate 40 (having no resin) to expose and develop the green resin layer into green color filter elements 54, such as shown in FIG. 3B. With the use of the aforementioned backside exposure step, each blue resin portion 52 can be aligned to the green resin layer. Then, a development step is used to remove the excess green resin layer located on the blue resin portions 52, and the one after the first portions 53 of the substrate 50 are filled, and hence the green color filter elements 54 are formed. Since the green resin fills in the first portions 53 of the substrate 50, by using the backside exposure method, the green color filter elements 54 are formed in a self-alignment manner on the first portions 53 of the substrate 50, and hence the overlapping problems of the conventional color filter elements do not occur any more.

Thereafter, the patterned photoresists 56 are formed by coating on the blue color filter elements 52 and the green color filter elements 54, such as shown in FIG. 3C. The blue resin that are not covered by the photoresists 56 on the portions 52 is then removed by, for example, dry etching or wet etching, to expose the second portions 59 of the substrate 50, and the remaining blue resin of the portions 52 is retained to be the blue color filter elements 58, such as shown in FIG. 3D, wherein either wet etching or dry etching may be used to etch the exposed blue resin that are not covered by the photoresists 56. As to the etchant used in the dry etching or wet etching process, any conventional etchant is suitable. The details of the etching process of the present invention are well understood by a person skilled in the art, thus they are not described herein.

After the residual photoresists are removed, a layer of red resin is formed by, for example, coating, and a backside exposure is preformed directly to the back of substrate 50 (having no resin), and a development step is further performed to remove the excess red resin located above the blue color filter elements 58 and the green color filter elements 54, and the one after the second portions 59 of the substrate 50 are filled, and hence the red resin layer becomes the red color filter elements 60. Therefore, these three flat and self-aligned color filter elements are formed, such as shown in FIG. 3E.

As described above, the second exposed portions 59 of the substrate 50 is filled with red resin and a backside exposure is thereafter preformed in a self-alignment manner with the blue color filter elements 58 and the green color filter elements 54, so that the overlapping problem of the conventional color filter elements can be avoided. These three color filter elements are formed by auto-filling and self-aligning, which not only simplifies the complicated photomask process, but also improves the flatness of the color filter elements.

Thereafter, a transparent conductive layer 62 is deposited by metal sputtering, such as shown in FIG. 3F, and the layer is usually made of ITO film. Then, a metal layer, for example, Cr, is further formed on the transparent conductive layer 62, and a patterned black matrix 64 is formed by photolithography, such as shown in FIG. 3G, wherein the black matrix 64 can be made of Cr or any other materials, but not limited thereto in the present invention. The purpose of the black matrix is to separate two lights with different colors and to decrease the white-light phenomena of the display panel and thereby to increase the color contrast.

According to the method of the present invention, the width of black matrix elements can be narrowed to increase the open ratio and reduce the errors in applying a process window, and thereby increase the brightness for LCD.

Figure 4:
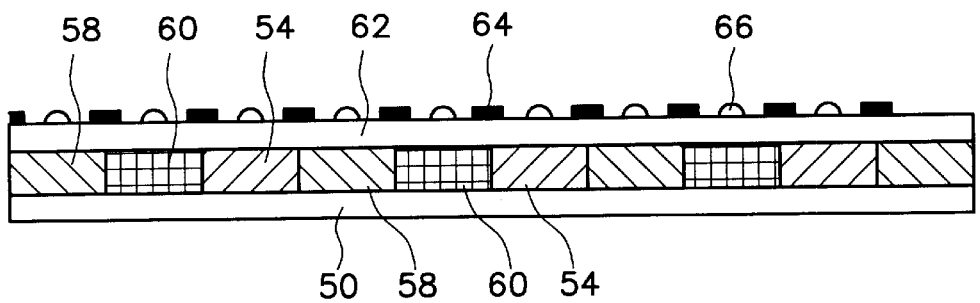
FIG. 4 is a schematic view showing a patterned protrusion structure formed on the structure as shown in FIG. 3G.
Figure 5:
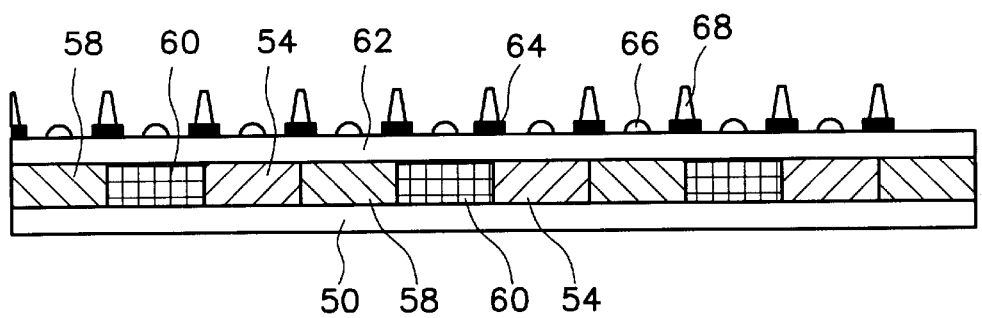
FIG. 5 is a schematic view showing a structure of photo spacers on the structure as shown in FIG. 4.

Furthermore, on the surface of transparent conductive layer 62 as shown in FIG. 3G, a patterned protrusion structure 66 as shown in FIG. 4 is formed by the process of deposition and defining, wherein the liquid crystal molecules can be arranged in a wide view angle. The present invention also forms a structure of photo spacers 68 on the surface of black matrix 64 to complete the structure as shown in FIG. 5.

Figure 6:
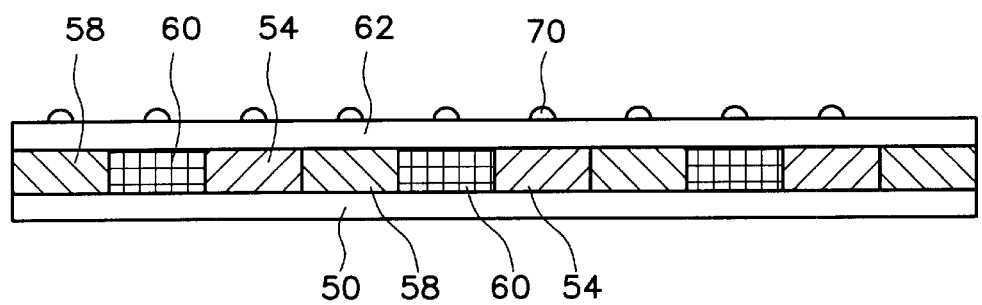
FIG. 6 is a schematic view showing a protrusion structure of black matrix type formed on the structure as shown in FIG. 3F.
Figure 7:
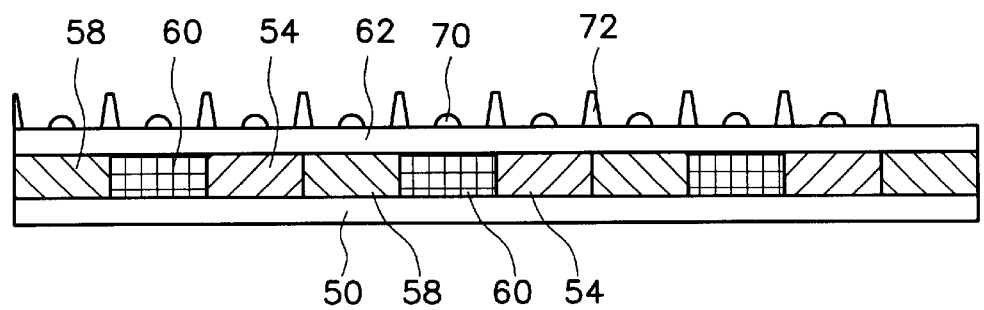
FIG. 7 is a schematic view showing a photo spacer structure of black matrix type formed on the structure as shown in FIG. 6.

Another embodiment of the present invention is to form the black-matrix typed structure of protrusions 70 (as shown in FIG. 6) and photo spacers 72 (as shown in FIG. 7) on the transparent conductive layer 62 shown in FIG. 3F as the black matrix of a color filter.

It is noted that the sequence for forming the color filter elements in the above embodiments is illustrated just for interpretation and the scope of the present invention is not limited thereto, wherein color filter elements 54, 58, and 60 can be blue, red and green color filter elements respectively, or, red, green and blue color filter elements respectively.

One advantage of the present invention is to use the backside exposure method to replace the conventional photolithographic process. Since the color filter elements do not need to be aligned repetitively, the problem of overlapping caused by repetitive alignments can then be avoided. The present invention utilizes the defined blue resin portions 52 with the addition of using the backside exposure method, whereby the color filter elements are auto-filled and self-aligned, and hence have good flatness.

Another advantage of the present invention results by changing the position of black matrix to be on the top of a transparent conductive layer, i.e., the transparent conductive layer is located between the layer of black matrix and the layer of color filter elements, whereby the surface of each color filter element is uniform and flat without the problem of bulginess, and the width of each black matrix element does not need to be increased to make up for alignment difficulty. Accordingly, with the reduction of the width of black matrix element and the increase of the width of process window, the open ratio is enhanced and the errors are avoided.

As is understood by a person skilled in the art, the foregoing preferred embodiments of the present invention are illustrations of the present invention rather than limitations of the present invention. It is intended that various modifications are covered and similar arrangements are included within the spirit and scope of the appended claims, the scope of which should be accorded the broadest interpretation so as to encompass all such modifications and similar structures.

What is claimed is:

1. A structure of color filter, comprising:

a substrate;

a first color filter element located on said substrate;

a self-aligned second color filter element located on said substrate and adjacent to said first color filter element;

a transparent conductive layer located on said first color filter element and said self-aligned second color filter element; and a black matrix layer located on the transparent conductive layer.

2. The structure of claim 1, wherein said transparent conductive layer is located between said black matrix layer, and said first color filter element and said self-aligned second color filter element.

3. The structure of claim 1, wherein the substrate is made of glass.

4. The structure of claim 1, wherein said first color filter element and said self-aligned second color filter element comprise a red color filter element, a blue color filter element and a green color filter element.

5. The structure of claim 1, wherein said black matrix layer is a photo spacer structure of black matrix type.

6. The structure of claim 1, wherein said black matrix layer is a protrusion structure of black matrix type.

7. A method of manufacturing a color filter, comprising:

providing a substrate and forming a first resin layer on the substrate;

defining said first resin layer to expose a first portion of said substrate;

forming a second resin layer on said first portion of said substrate;

forming a self-aligned second color filter element by a first backside exposure from the second resin layer;

defining said first resin layer to expose a second portion of the substrate, wherein the remaining portion of said first resin layer on said substrate is a first color filter element;

forming a third resin layer on said second portion of said substrate; and forming a self-aligned third color filter element by a second backside exposure from said third resin layer.

8. The method of claim 7, wherein after said second backside exposure is performed, a transparent conductive layer is further deposited on said first color filter element, said self-aligned third color filter element and said self-aligned second color filter element.

9. The method of claim 8, wherein said transparent conductive layer is made of indium tin oxide (ITO) film.

10. The method of claim 8, wherein a black matrix layer is further formed on said transparent conductive layer.

11. The method of claim 10, wherein said black matrix layer is a photo spacer structure of black matrix type.

12. The method of claim 10, wherein said black matrix layer is a protrusion structure of black matrix type.

13. The method of claim 7, wherein the substrate is made of glass.

14. The method of claim 7, wherein said first resin layer is a blue resin layer, and said second resin layer is a green resin layer, and said third resin layer is a red resin layer, and said first color filter element is a blue color filter element, and said self-aligned second color filter element is a green color filter element, and said self-aligned third color filter element is a red color filter element.

15. The method of claim 7, wherein said first resin layer is a red resin layer, and said second resin layer is a blue resin layer, and said third resin layer is a green resin layer, and said first color filter element is a red color filter element, and said self-aligned second color filter element is a blue color filter element, and said self-aligned third color filter element is a green color filter element.

16. The method of claim 7, wherein said first resin layer is a green resin layer; said second resin layer is a red resin layer, and said third resin layer is a blue resin layer, and said first color filter element is a green color filter element, and said self-aligned second color filter element is a red color filter element, and said self-aligned third color filter element is a blue color filter element.

17. A method of manufacturing a color filter, comprising:

providing a substrate and forming a first resin layer on the substrate;

defining said first resin layer to expose a first portion of said substrate;

forming a second resin layer on said first portion of said substrate;

forming a second color filter element by a first backside exposure from the second resin layer using said first resin layer as a first photomask;

defining said first resin layer to expose a second portion of the substrate, wherein the remaining portion of said first resin layer on said substrate is a first color filter element;

forming a third resin layer on said second portion of said substrate; and forming a third color filter element by a second backside exposure from said third resin layer using said first and second resin layer as a second photomask.

18. The method of claim 17, wherein after said second backside exposure is performed, a transparent conductive layer is further deposited on said first color filter element, said third color filter element and said second color filter element.

19. The method of claim 18, wherein a black matrix layer is further formed on said transparent conductive layer.

* * * * *